Dec. 30, 1930.                    C. S. SORENSEN                    1,787,094
                    CENTRIFUGAL MOLDING APPARATUS AND PROCESS
                              Filed Jan. 4, 1930
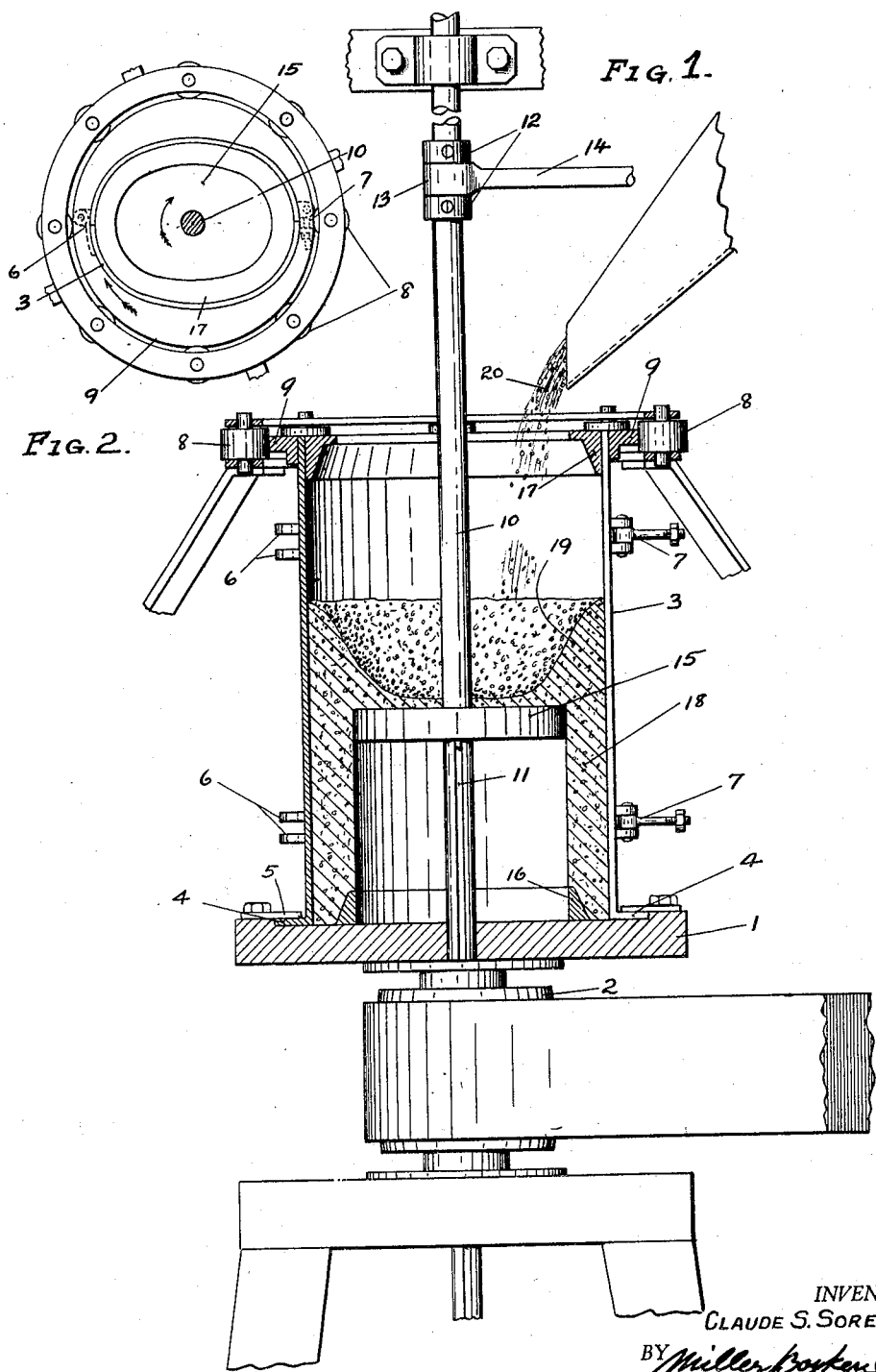
INVENTOR.
CLAUDE S. SORENSEN
BY *Miller, Boyken & Bried*
ATTORNEYS.

Patented Dec. 30, 1930

1,787,094

UNITED STATES PATENT OFFICE

CLAUDE S. SORENSEN, OF SAN CARLOS, CALIFORNIA, ASSIGNOR TO CALIFORNIA CONCRETE PRODUCTS CO., OF SUNNYVALE, CALIFORNIA, A CORPORATION OF CALIFORNIA

CENTRIFUGAL MOLDING APPARATUS AND PROCESS

Application filed January 4, 1930. Serial No. 418,538.

This invention relates to the centrifugal molding of concrete pipe and the objects are to provide apparatus and process whereby centrifugal molding of concrete pipe will be expedited and the quality of the product enhanced, also apparatus and process which will produce other forms as well as round pipe by centrifugal molding.

In the drawings accompanying this application Fig. 1 is a sectional view of the molding portions of the apparatus showing half of the mold shell removed and a portion of a pipe in the shell in process of being molded by the apparatus.

Fig. 2 is a plan view of the oval mold and bore disk as used for making oval concrete pipe by my centrifugal molding process and apparatus.

The essential features of the apparatus comprise a high speed revolving table 1 revolved on a vertical axis by a motor or belt driven pulley 2, while vertically mounted upon the table is a cylindrical metal mold shell 3 of an inside diameter to form the outside of the pipe and which mold shell is secured to the table for rotation therewith as by providing a flange 4 on its lower end clamped into a recess on the table by means of clamps 5 or otherwise.

This cylindrical shell is preferably made in halves hinged at one side as at 6 and clamped by clamps 7 at the other side, or it may be bolted or clamped along both side joints if desired.

If the cylinder is of rigid construction it may not require guiding means at its upper end, though if of comparatively thin metal or very long it is advisable to have a circle of guide rollers 8 bearing against a circular track 9 secured around the upper end to stiffen it to the point required.

Within the cylinder is a central shaft 10 vertically slidable through an aperture in the table and splined thereto as at 11 or otherwise arranged for revolving with the table while permitting vertical movement relative thereto. At the upper end of the shaft are two spaced collars 12, between which is a bearing 13 provided with one or more laterally extending arms as at 14 by means of which the shaft may be raised and lowered while held in axial alignment within the cylinder.

Within the cylinder and secured to the shaft is a forming disk 15.

Other features of the mold are socket and nose forming rings 16, 17 at oposite ends of the cylinder, the former being preferably secured to the table 1 and the latter to the cylinder shell, and both rings to be of an inside diameter to freely pass the former disk 15.

Fig. 2 shows a plan view of a mold shell and former disk of oval form with the various parts above described and similarly numbered. The mold shell and disk may be of any form, round, oval hexagon, or even square, as the disk and shell revolve together in carrying out my process. Any form of shell however will revolve around a central vertical axis and any guiding ring used on top as at 9 will of course be round to hold the revolving mass from becoming out of balance. Oval concrete pipe is found to be much stronger than round pipe when laid with its longer axis vertical.

When molding pipe with my apparatus the disk 15 is lowered to the bottom of the mold shell to rest upon the table and the table is revolved at a high speed, some 2000 foot rim speed of the mold shell being found satisfactory, and the properly moistened concrete or cement mixture just about sufficient for the pipe to be molded is gradually introduced into the upper end of the cylinder to fall upon the disk and pile up above the same, and simultaneously the disk is slowly raised to the top of the cylinder, and which, through the action of centrifugal force distributes the material evenly around the inside of the shell in the form of a pipe as shown at 18 in Fig. 1 and wherein the unplaced material still on top of the disk is seen at 19, and incoming material at 20.

The disk may then be lowered and the mold be kept spinning for a few minutes to thoroughly compact the pipe which will make it a trifle larger inside than the diameter of the former disk, though if desired an additional quantity of rich finishing cement mixture may be deposited in the mold and the disk again gradually raised to thus build and trowel an almost impervious integral lining within the pipe of an even thickness all around.

It is evident that such a lining of greater thickness may easily be produced by changing the disk 15 to a smaller one before introducing the finishing cement mixture.

It is important to use a proper cement mixture without too much water in it when molding pipe by this process so that the mold may be opened up and the pipe removed shortly after forming. The shell may be lifted from the table with the pipe and the pipe allowed to set more firmly before opening the shell if desired, though in practice it is found that the pipe may be removed as soon as properly formed as it is extremely compact and easily transported without injury to the curing yard with proper care.

It is manifest without further showing or description that any desired form of reinforcing wire may be positioned in the mold before introducing the cement or concrete mixture.

I am aware of prior apparatus for the centrifugal molding of cement or concrete pipe, but such apparatus had a cylindrical core within the shell which made it extremely difficult to introduce the material evenly without weak spots, while other apparatus employed stationary outer shells and revolving disks with wiper vanes to throw the material against the stationary shell, but such apparatus is slow, subject to great wear, and cannot produce the density of walls produced by my process wherein the material is free above the disk to find its own position under the action of centrifugal force only and every particle of the pipe is continually urged outward with great force during every stage of formation as well as afterwards until the machine is stopped.

I claim:

1. Centrifugal pipe molding apparatus comprising a vertically disposed revolvable mold shell, means for supporting and revolving the shell at high speed, a disk within the shell substantially of the diameter of the inside of the pipe to be molded, means supporting said disk centrally within the shell and for vertical movement, and means for raising and lowering said disk within the shell.

2. Centrifugal pipe molding apparatus comprising a vertically disposed revolvable mold shell, means for supporting and revolving the shell at high speed, a disk within the shell substantially of the diameter of the inside of the pipe to be molded, means supporting said disk centrally within the shell and for vertical movement, means for raising and lowering said disk within the shell, and means for revolving said disk with the shell.

3. Centrifugal pipe molding apparatus comprising a vertically disposed revolvable mold shell, means for supporting and revolving the shell at high speed, a disk within the shell substantially of the diameter of the inside of the pipe to be molded, means supporting said disk centrally within the shell and for vertical movement, means for raising and lowering said disk within the shell, and pipe end joint forming rings respectively at opposite ends of and within the shell arranged to revolve therewith and being of an internal diameter to pass said disk.

4. Centrifugal pipe molding apparatus comprising a vertically disposed mold shell, a horizontally disposed revolvable table on which the lower end of said shell is detachably secured, a shaft passing vertically through the center of the table arranged to revolve therewith, a disk of an exterior diameter substantially equal to the interior diameter of the pipe to be molded on said shaft, means for revolving said table and shaft, and means for raising and lowering the disk within the mold as the same is revolved.

5. Centrifugal pipe molding apparatus comprising a vertically disposed mold shell, a horizontally disposed revolvable table on which the lower end of said shell is detachably secured, a shaft passing vertically and slidably through the center of the table arranged to revolve in unison therewith, a disk of an exterior diameter substantially equal to the interior diameter of the pipe to be molded secured to said shaft, means for revolving said table and shaft, and means for raising and lowering said disk within the mold shell as the same is revolved.

6. In a structure as specified in claim 4, means for centralizing the upper end of the shell and guiding same for revolution.

7. In a structure as specified in claim 4, means for centralizing the upper end of the shell and guiding same for revolution comprising a track ring around the shell and rollers bearing thereagainst.

8. In a structure as specified in claim 1, said mold shell and disk being of oval cross section.

9. In a structure as specified in claim 4, said mold shell and disk being of oval cross section.

10. The process of centrifugal molding of cement pipe which comprises spinning a vertical mold shell and a disk core at high speed and raising the disk from the bottom of the mold through moist cement material placed on top of the disk.

11. The process of centrifugal molding of cement pipe which comprises spinning a vertical mold shell and a disk core at high speed and raising the disk from the bottom of the mold through moist cement material placed on top of the disk, continuing the spinning action until the bore of the pipe is slightly larger than the disk and repeating the operation with fresh addition of cement mixture.

12. The process of centrifugal molding of cement pipe which comprises spinning a vertical mold shell and a disk core at high speed and raising the disk from the bottom of the mold through moist cement material placed on top of the disk, continuing the spinning action until the bore of the pipe is slightly larger than the disk and repeating the operation with fresh addition of rich cement mixture for forming a lining within said pipe.

CLAUDE S. SORENSEN.